US011781007B2

(12) United States Patent
Van Nuffel et al.

(10) Patent No.: US 11,781,007 B2
(45) Date of Patent: Oct. 10, 2023

(54) STABILIZED COMPOSITIONS OF POLYCARBONATES AND VINYLIDENE SUBSTITUTED AROMATIC COMPOUNDS

(71) Applicant: TRINSEO EUROPE GMBH, Horgen (CH)

(72) Inventors: Claude T. E. Van Nuffel, Oostakker (BE); Gilbert Bouquet, Ghent (BE); Maurice Laurijs, Middelburg (NL)

(73) Assignee: TRINSEO EUROPE GMBH, Pfaeffikon (CH)

( * ) Notice: Subject to any disclaimer, the term of this patent is extended or adjusted under 35 U.S.C. 154(b) by 0 days.

(21) Appl. No.: 17/637,634

(22) PCT Filed: Aug. 21, 2020

(86) PCT No.: PCT/EP2020/073508
§ 371 (c)(1),
(2) Date: Feb. 23, 2022

(87) PCT Pub. No.: WO2021/037729
PCT Pub. Date: Mar. 4, 2021

(65) Prior Publication Data
US 2022/0267585 A1 Aug. 25, 2022

(30) Foreign Application Priority Data
Aug. 27, 2019 (EP) ...................... 19193760

(51) Int. Cl.
| C08L 55/02 | (2006.01) |
| B29B 9/06 | (2006.01) |
| B29C 45/00 | (2006.01) |
| C08K 3/014 | (2018.01) |
| C08K 3/32 | (2006.01) |
| C08K 5/00 | (2006.01) |
| B29K 55/02 | (2006.01) |
| B29K 69/00 | (2006.01) |
| B29K 105/00 | (2006.01) |

(52) U.S. Cl.
CPC .............. C08L 55/02 (2013.01); B29B 9/06 (2013.01); B29C 45/0001 (2013.01); B29K 2055/02 (2013.01); B29K 2069/00 (2013.01); B29K 2105/0005 (2013.01); C08L 2203/30 (2013.01)

(58) Field of Classification Search
None
See application file for complete search history.

(56) References Cited

U.S. PATENT DOCUMENTS

| 3,981,944 | A | * | 9/1976 | Okamoto | ............... | C08F 279/02 |
| | | | | | | 525/54 |
| 5,276,077 | A | | 1/1994 | Schwane et al. | | |
| 8,106,995 | B2 | * | 1/2012 | Tamaru | ................ | H04N 5/2356 |
| | | | | | | 348/349 |
| 11,021,602 | B2 | * | 6/2021 | Michaelis De Vasconcellos | ........ |
| | | | | | | C08L 23/0869 |
| 2002/0137822 | A1 | | 9/2002 | Seidel et al. | | |
| 2003/0199622 | A1 | | 10/2003 | Vathauer et al. | | |
| 2006/0079615 | A1 | | 4/2006 | DeRudder et al. | | |
| 2007/0049701 | A1 | | 3/2007 | Kim | | |
| 2009/0043038 | A1 | | 2/2009 | Rogunova et al. | | |
| 2009/0239991 | A1 | | 9/2009 | Avtomonov et al. | | |
| 2010/0249290 | A1 | | 9/2010 | Feldermann et al. | | |
| 2011/0288243 | A1 | * | 11/2011 | Jueptner | ................ | C08G 71/00 |
| | | | | | | 525/464 |
| 2013/0131241 | A1 | | 5/2013 | van de Grampel et al. | | |
| 2013/0203909 | A1 | | 8/2013 | Kulkarni et al. | | |
| 2013/0203911 | A1 | | 8/2013 | Kulkarni et al. | | |
| 2014/0275375 | A1 | | 9/2014 | Sun et al. | | |
| 2014/0275382 | A1 | | 9/2014 | Ishida | | |
| 2014/0275424 | A1 | | 9/2014 | Vilasagar et al. | | |
| 2015/0368488 | A1 | * | 12/2015 | Robello | ............... | C09D 11/102 |
| | | | | | | 524/560 |
| 2018/0128807 | A1 | * | 5/2018 | Ishizaka | ................ | G01N 33/96 |
| 2019/0031877 | A1 | | 1/2019 | Eckel et al. | | |

FOREIGN PATENT DOCUMENTS

| CN | 101977978 A | 2/2011 |
| CN | 102361923 A | 2/2012 |
| CN | 105102538 A | 11/2015 |

(Continued)

OTHER PUBLICATIONS

Extended European Search Report in co-pending application EP19193760.6 dated Dec. 10, 2019 (7 pages).
International Preliminary Report on Patentability in co-pending application PCT/EP2020/073508 dated Sep. 30, 2021 (6 pages).
International Search Report in co-pending application PCT/EP2020/073508, dated Oct. 2, 2020 (2 pages).
First Office Action (with English translation) in co-pending application CN202080060187.8 dated Nov. 7, 2022 (12 pages).
Buffers—Chemistry LibreTexts. https://chem.libretexts.org/Bookshelves/Physical_and_Theoretical_Che...Modules_(Physical_and_Theoretical_Chemistry)/Acids_and_Bases/Buffers. Downloaded Apr. 27, 2023.
SpecialChem Products Listing: Acid Scavengers > Hydrotalcites, https://polymer-additives.specialchem.com/product-categories/additives-acid-scavengers-hydrotalcites. SpecialChem 2023.

Primary Examiner — Tae H Yoon
(74) Attorney, Agent, or Firm — Young Basile Hanlon & MacFarlane, P.C.

(57) ABSTRACT

A composition comprising: one or more polycarbonates; one or more vinylidene aromatic substituted polymers; and a buffer system that controls the pH in water at 25° C. at a value of about 6.0 to about 8.0. The composition may comprise the buffer system that has a pKa between about 4 and about 10. The composition may comprise: from about 10 or 50 to about 95 percent by weight of the one or more polycarbonates; from about 0.5 or about 10 to about 50 or about 90 percent by weight of the one or more vinylidene aromatic substituted monomers; and from about 0.005 percent to about 0.050 percent by weight of the buffer system; wherein weight is based on the total weight of the composition. The buffer system may be present in an amount from about 0.010 percent to about 0.040 percent by weight.

20 Claims, No Drawings

(56) References Cited

FOREIGN PATENT DOCUMENTS

| | | | |
|---|---|---|---|
| CN | 108779324 | A | 11/2018 |
| EP | 827981 | A2 | 3/1998 |
| EP | 885929 | A1 | 12/1998 |
| JP | H10217412 | A | 8/1998 |
| WO | 2009129962 | A1 | 10/2009 |
| WO | 2010017067 | A1 | 2/2010 |
| WO | 2011107273 | A1 | 9/2011 |
| WO | 2011110365 | A1 | 9/2011 |
| WO | WO 2012/022710 | A1 * | 2/2012 |

\* cited by examiner

STABILIZED COMPOSITIONS OF POLYCARBONATES AND VINYLIDENE SUBSTITUTED AROMATIC COMPOUNDS

CROSS-REFERENCE TO RELATED APPLICATIONS

This application is a National Stage 371 entry of PCT/EP2020/073508 filed on Aug. 21, 2020 published as WO 2021037729A1, which claims priority to European Patent Office Application 19193760.6 filed on Aug. 27, 2019, both of which are incorporated herein by reference in its entirety for all purposes.

TECHNICAL FIELD

This disclosure relates to polymer blends of stabilized compositions of polycarbonates and vinylidene substituted aromatic compounds that have a controlled pH, and methods directed to making the same polymer blends.

BACKGROUND

Polymer blends containing polycarbonates and vinylidene substituted aromatic compounds that contain conjugated diene rubber have been widely used as, see Van Nuffel et al. WO2010017067A1; Van Nuffel et al. WO2011107273; Van Nuffel et al. WO2011110365, all incorporated herein by reference for all purposes. Vinylidene substituted aromatic compounds, such as acrylonitrile-butadiene-styrene (ABS), can be produced by polymerizing unsaturated nitriles, conjugated dienes, and vinylidene substituted aromatic monomers through an emulsion, bulk, or mass polymerization process. In certain processes, polycarbonates having a variety of formulations can be used in the blending process, and the conjugated diene rubbers used for vinylidene substituted aromatic compounds vary in formulation because the rubbers can come from a variety of sources. Because of the variation in polycarbonates and conjugated diene rubbers used in these compositions, producing compositions of polycarbonates and vinylidene substituted aromatic compounds with consistent properties are desirable. Exemplary properties may include molecular weight stability, hydrolytic stability, toughness/impact properties, tensile strength, melt flow rates, and color variations. The problem of consistency is especially apparent when more than one conjugated diene rubber or more than one polycarbonate that are provided from different sources are used to produce polymer blends. Without knowing the specific profile of each conjugated diene rubber or polycarbonate, solving the consistency issues requires an additive. Several references disclose compositions of polymer blends containing polycarbonates and vinylidene substituted aromatic compounds with varying additives that aim to enhance stability properties, such as US Publications 2014/0275375 and 2013/0131241. These references fail to disclose compositions of polymer blends containing polycarbonates and vinylidene substituted aromatic compounds based on conjugated diene rubbers that contain minimal additive amounts to provide consistent properties, without disrupting the manufacturing process or negatively impacting other properties.

Thus, there is a need for polymer blends containing polycarbonates and vinylidene substituted aromatic compounds that contain conjugated diene rubbers having consistent properties, in particular excellent molecular weight stability, hydrolytic stability, processing stability and color stability when exposed to higher temperature and/or humidity, such as in oven aging, climate aging, processing at higher temperatures, and the like. Furthermore, there is a need for methods directed towards making the same polymer blends.

SUMMARY

Disclosed are compositions comprising one or more polycarbonates, one or more vinylidene substituted aromatic polymers, and a buffer system that controls the pH. The buffer system may control the pH in water at 25° C. at a value of about 6.0 to about 8.0. The buffer system may have a pKa between about 4.0 and about 10. The composition may contain from about 10 or about 50 to about 95 percent by weight of the one or more polycarbonates, from about 0.5 to about 50, or about 10 to about 90, percent by weight of the one or more vinylidene substituted aromatic polymers and from about 0.010 percent to about 0.050 percent by weight of the buffer system, wherein weight is based on the total weight of the composition. The buffer system may be an inorganic buffer, an organic buffer, or both. The buffer system may comprise a counterion that may be any metal including sodium, potassium, calcium, a similar counterion, or any combination thereof. The buffer system may comprise acetates, sulfonates, phosphates, ammonia, formates, or any combination thereof. The buffer system may comprise a Good's buffer. The composition may be free of phosphoric acid. The vinylidene substituted aromatic polymers may contain one or more unsaturated nitriles which may comprise acrylonitrile, methacrylonitrile, ethacrylonitrile, fumaronitrile or mixtures thereof. The vinylidene substituted aromatic polymers may contain one or more conjugated dienes comprising conjugated 1,3 dienes (for example butadiene, isoprene, etc.); alpha- or beta-unsaturated monobasic acids and derivatives thereof (for example, acrylic acid, methacrylic acid, etc.); vinyl halides such as vinyl chloride, vinyl bromide, etc.; vinylidene chloride, vinylidene bromide, etc.; vinyl esters such as vinyl acetate, vinyl propionate, etc.; ethylenically unsaturated dicarboxylic acids and anhydrides and derivatives thereof, such as maleic acid, fumaric acid, maleic anhydride, dialkyl maleates or fumarates, such as dimethyl maleate, diethyl maleate, dibutyl maleate, the corresponding fumarates, N-phenyl maleimide (N-PMI) or mixtures thereof. The vinylidene substituted aromatic polymers may contain one or more vinylidene substituted aromatic monomers, which may comprise styrene, alpha methyl styrene, N-phenyl-maleimide, and chlorinated styrenes; or alpha-methyl styrene.

Disclosed is a method comprising: mixing the one or more polycarbonates, the one or more vinylidene substituted aromatic polymers, and the buffer system; and extruding the mixed polymer. The method may further comprise the step of polymerizing the one or more vinylidene substituted aromatic polymers by a mass polymerization process comprising cutting or chopping the one or more polymers of conjugated dienes (for example polybutadienes); mixing the one or more polymers of conjugated dienes, the one or more unsaturated nitriles, and the one or more vinylidene substituted aromatic monomers; polymerizing the one or more polymers of conjugated dienes, the one or more unsaturated nitriles, and the one or more vinylidene substituted aromatic monomers; degassing the one or more vinylidene substituted aromatic polymer formed and recycling volatile monomers; and pelletizing the one or more vinylidene substituted aromatic polymers. The polymers of conjugated dienes may dissolve in the unsaturated nitriles and/or vinylidene substituted aromatic monomers. A solution of the polymers of conjugated dienes may dissolved in the unsaturated nitriles and/or vinylidene substituted aromatic monomers may be polymerized.

The compositions of polycarbonates and vinylidene substituted aromatic polymers containing buffer systems that exhibit molecular weight degradation of the polycarbonate component during compounding temperatures between 175° C. and 350° C. that exhibit a loss of molecular weight of about 7000 g/mol or less, about 6000 g/mol or less, or about 5000 g/mol or less. The compositions of polycarbonates and vinylidene substituted aromatic polymers containing buffer systems that exhibit according to exposure to an autoclave at 125° C./100% relative humidity for 24 hours a loss of molecular weight of the polycarbonate component of about 5000 g/mol or less, about 4000 g/mol or less, or about 3000 g/mol or less. The compositions of polycarbonates and vinylidene substituted aromatic polymers containing buffer systems that exhibit according to ISO 1133 under the following conditions (260° C./5 kg) a melt flow rate shift (between 30' and 7' holding time) of about 50% or less, about 40% or less, or about 30% or less. The compositions of polycarbonates and vinylidene substituted aromatic polymers containing buffer systems exhibit increased impact strength according to the Charpy test according to ISO 179/eA at 23 degrees Celsius of about 30 kJ/m$^2$ or more, about 40 kJ/m$^2$ or more, or about 50 kJ/m$^2$ or more. The compositions of polycarbonates and vinylidene substituted aromatic polymers containing buffer systems that exhibit increased impact strength according to the Charpy test according to ISO 179/eA at −30 degrees Celsius of about 25 kJ/m$^2$ or more, about 30 kJ/m$^2$ or more, or about 35 kJ/m$^2$ or more. The composition of polycarbonates and vinylidene substituted aromatic polymers containing buffer systems have improved color properties when used with UV additives.

The explanations and illustrations presented herein are intended to acquaint others skilled in the art with the disclosure, its principles, and its practical application. Accordingly, the specific embodiments of the present disclosure as set forth are not intended as being exhaustive or limiting of the claims. The scope of the claims should, therefore, be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

DETAILED DESCRIPTION

Disclosed is a polymeric composition of polycarbonates, vinylidene substituted aromatic polymers, and buffer system that has a pH in water of about neutral. Also disclosed herein are polymerizable compositions utilized to prepare the polymers used in the compositions described. The vinylidene substituted aromatic polymers may comprise one or more vinylidene substituted aromatic monomers and optionally, one or more unsaturated nitriles and/or one or more conjugated dienes. The buffer system may be one or more buffers that control the pH of water to about neutral. The buffer system may comprise a buffer that has a pKa of about neutral. The composition may comprise about 0.010 to about 0.050 percent by weight of buffer system, based on the total weight of the polymeric composition. The composition may contain from about 10 to about 95 percent by weight of the one or more polycarbonates, from about 0.5 or about 10 to about 90 or about 70 percent by weight of the one or more vinylidene substituted aromatic monomers and from about 0.010 percent to about 0.050 percent by weight of the buffer system, based on the weight is based on the total weight of the composition. The buffer system may enhance the melt flow rate of the polycarbonate, the vinylidene substituted aromatic compound, the blends of polycarbonate and vinylidene substituted aromatic compound, or any combination thereof. The buffer system may enhance the molecular weight the molecular weight stability of the polycarbonate, the vinylidene substituted aromatic compound, the blends of polycarbonate and vinylidene substituted aromatic compound, or any combination thereof, thus reducing the decrease in molecular weight under processing conditions or exposure to high humidity conditions. The composition may include UV additives. The buffer system may improve color qualities when UV additives are present in the composition. The polycarbonate may be any polycarbonate suitable to compound with vinylidene substituted aromatic compounds, buffer systems, or both. The composition may include additives that enhance properties so long as the melt flow rate and molecular weight are not negatively impacted. Disclosed herein are methods of producing compositions containing polycarbonates, vinylidene substituted aromatic compounds, and buffer systems that have a pH in water of about neutral. The methods disclosed herein may further comprise methods for producing vinylidene substituted aromatic compounds through mass, bulk, or emulsion polymerization. Disclosed herein are methods of making articles through molding and the like.

The "SAN copolymer" as used herein means a copolymer of unsaturated nitriles and vinylidene substituted aromatic monomers. The rubber modifiers as used herein is interchangeable with conjugated dienes. Impact modifiers as described herein are any substance used to improve the impact strength qualities of the one or more polymers. As used herein percent by weight or parts by weight refer to, or are based on, the weight of the disclosed compositions unless otherwise specified. Unless otherwise stated such parts by weight are based on 100 parts. Polymerizable compositions as used herein means compositions used to prepare the polymers described herein including vinylidene substituted aromatic polymers and polycarbonates.

Polycarbonate

The composition disclosed herein includes polycarbonates. Polycarbonate as used herein means a polymer containing carbonate units. Such polymers may be homopolymers consisting essentially of carbonate monomer units or copolymers containing one or more other monomer units (co-monomer units) and carbonate units. Such copolymers may be block copolymers containing two or more blocks of different monomer units or may be random copolymers with the different monomer units randomly located along the polymer backbone. The other monomer units may comprise any monomer units that do not negatively impact the inherent properties of polycarbonates, for instance heat resistance, impact resistance, moldability, flexural modulus, bending strength, haze and transparency, where required for the intended use. Among exemplary comonomer units are ester units, polysiloxane units, and the like. The amount of carbonate monomer units in copolycarbonates is selected such that the resulting polymer retains the desirable properties of polycarbonates, for instance heat resistance, impact resistance, moldability, flexural modulus, bending strength, elongation, tensile strength and Notched Izod impact strength, where required for the intended use. The copolycarbonates may contain greater than 50 mole percent carbonate monomer units, about 75 mole percent or greater carbonate monomer units, about 80 mole percent or greater carbonate monomer units or about 85 mole percent or greater carbonate monomer units. The copolycarbonates may contain about 99 mole percent or less carbonate monomer units, about 97 mole percent or less carbonate monomer units or about 95 mole percent or less carbonate monomer units. The copolycarbonates may contain about 1 mole percent or greater co-monomer monomer units, about 3 mole percent or greater co-monomer monomer units or about 5 mole percent or greater co-monomer monomer units. The copolycarbonates may contain less than 50 mole percent co-monomer monomer units, about 25 mole percent or less co-monomer monomer units, about 20 mole percent or less co-monomer monomer units or about 15 mole percent or less co-monomer monomer units. The polycarbonate units may contain aromatic units in the backbone of the polymer.

The production of polycarbonates is affected, for example, by the reaction of diphenols with carbonic acid halides, preferably phosgene, and/or with aromatic dicarboxylic acid dihalides, preferably benzenedicarboxylic acid dihalides, by the phase boundary method, optionally with the use of chain terminators, e.g., monophenols, and optionally with the use of trifunctional branching agents or branching agents with a functionality higher than three, for example triphenols or tetraphenols. Diphenols useful to produce the aromatic polycarbonates and/or aromatic polyester carbonates may correspond to formula I

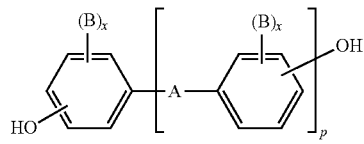

wherein A denotes a single bond, a $C_1$-$C_5$ alkylene, a $C_2$-$C_5$ alkylidene, a $C_5$-$C_6$ cycloalkylidene, —O—, —SO—, —CO—, —S—, —SO2-, or a $C_6$-$C_{12}$ arylene, on to which other aromatic rings, which optionally contain hetero atoms, can be condensed, or a radical of formula II or III:

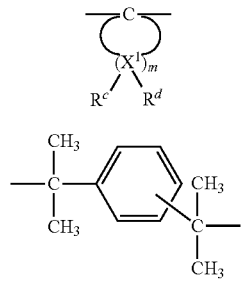

wherein B in each case is independently hydrogen, a $C_1$-$C_{12}$ alkyl, preferably methyl, or a halogen, preferably chlorine and/or bromine;
x in each case is mutually independently 0, 1, or 2;
p is 0 or 1;
$R^c$ and $R^d$ are mutually independent of each other and are individually selectable for each $X^1$ and are hydrogen or a $C_1$-$C_6$ alkyl, preferably hydrogen, methyl or ethyl;

$X^1$ denotes carbon; and
m denotes an integer from 4 to 7, preferably 4 or 5, with the proviso that $R^c$ and $R^d$ simultaneously denote an alkyl on at least one $X^1$ atom.

Exemplary diphenols are hydroquinone, resorcinol, dihydroxybiphenyls, bis(hydroxyphenyl)-$C_1$-$C_5$ alkanes, bis(hydroxyphenyl)-$C_5$-$C_6$ cycloalkanes, bis(hydroxyl-phenyl) ethers, bis(hydroxyphenyl)sulfoxides, bis(hydroxyphenyl) ketones, bis(hydroxyl-phenyl)sulfones and 4,4"-bis(hydroxyphenyl)diisopropylbenzenes, as well as derivatives thereof which have brominated and/or chlorinated nuclei. Diphenols which are particularly preferred are 4,4'-dihydroxybiphenyl, bisphenol A, 2,4-bis(4-hydroxyphenyl)-2-methyl-butane, 1,1-bis(4-hydroxyphenyl)-cyclohexane, 1,1-bis(4-hydroxyphenyl)-3,3,5-trimethyl-cyclohexane, 4,4-dihydroxydiphenyl sulfide and 4,4-dihydroxydiphenyl sulfone, as well as di- and tetrabrominated or chlorinated derivatives thereof, such as 2,2-bis(3-chloro-4-hydroxyphenyl)propane, 2,2-bis-(3,5-dichloro-4-hydroxyphenyl)propane or 2,2-bis(3,5-dibromo-4-hydroxyphenyl)propane. 2,2-bis-(4-hydroxyphenyl) propane (bisphenol A) is preferred. The diphenols can be used individually or mixtures. The diphenols are known from the literature or can be obtained by methods known from the literature. Apart from bisphenol A homopolycarbonates, exemplary polycarbonates include copolycarbonates of bisphenol A with up to 15 mole percent, with respect to the molar sums of the diphenols, of other diphenols which are disclosed, such as 2,2-bis(3,5-dibromo-4-hydroxyphenyl)-propane.

Exemplary chain terminators for the production of the polycarbonates include phenolic compounds, exemplary phenolic compounds include phenol, p-chlorophenol, p-tert-butylphenol, 4-(1,3-dimethyl-butyl)-phenol and 2,4,6-tribromophenol; long chain alkylphenols, such as monoalkylphenols or dialkylphenols which contain a total of 8 to 20 C atoms in their alkyl substituents, exemplary are 3,5-di-tert-butyl-phenol, p-iso-octylphenol, p-tert-octylphenol, p-dodecylphenol, 2-(3,5-dimethylheptyl)-phenol and 4-(3,5-dimethylheptyl)-phenol. The amount of chain terminators used may be about 0.1 mole percent or greater based on the molar sum of the diphenols used in each case. The amount of chain terminators used may be about 10 mole percent or less based on the molar sum of the diphenols used in each case.

The polycarbonates can be branched in the known manner, for example by the incorporation of about 0.05 to about 2.0 mole percent, with respect to the sum of the diphenols used, of trifunctional compounds or of compounds with a functionality higher than three, for example those which contain three or more phenolic groups. Branched polycarbonates useful for the compositions disclosed can be prepared by known techniques, for example several methods are disclosed in U.S. Pat. Nos. 3,028,365; 4,529,791; and 4,677,162; which are hereby incorporated by reference in their entirety. Exemplary branching agents that may be used are tri- or multi-functional carboxylic acid chlorides, such as trimesic acid trichloride, cyanuric acid trichloride, 3,3'-,4, 4'-benzophenone tetracarboxylic acid tetrachloride, 1,4,5,8-naphthalene-tetracarboxylic acid tetrachloride or pyromellitic acid tetrachloride for example, in amounts of about 0.01 to about 1.0 mole percent (with respect to the dicarboxylic acid dichlorides used) or tri- or multi-functional phenols such as phloroglucinol, 4,6-dimethyl-2,4,6-tris(4-hydroxyphenyl)-2-heptene, 4,4-dimethyl-2,4,6-tris(4-hydroxyphenyl)heptane, 1,3,5-tris(4-hydroxyphenyl)-benzene, 1,1,1-tris(4-hydroxyphenyl)ethane, tris(4-hydroxyphenyl)-phenylmethane, 2,2-bis[4,4-bis(4-hydroxyphenyl)cyclohexyl]- propane, 2,4-bis[1-(4-hydroxyphenyl)-1-methyl-ethyl] phenol, tetrakis(4-hydroxyphenyl)-methane, 2,6-bis(2-hydroxy-5-methyl-benzyl)-4-methyl-phenol, 2-(4-hydroxyphenyl)-2-(2,4-dihydroxyphenyl)propane, or tetrakis(4-[1-(4-hydroxyphenyl)-1-methylethyl]-phenoxy)-methane in amounts of about 0.01 to about 1.0 mole percent with respect to the diphenols used. Phenolic branching agents can be placed in the reaction vessel with the diphenols. Acid chloride branching agents can be introduced together with the acid chlorides.

Copolycarbonates, copolymers containing carbonate units and other monomer units, may be prepared by known processes. In one exemplary embodiment, about 1 to about 25 parts by weight, about 2.5 to about 25 parts by weight (with respect to the total amount of diphenols to be used) of polydiorganosiloxanes comprising hydroxy-aryloxy terminal groups can also be used. These are known (see, for example, U.S. Pat. No. 3,419,634) or can be produced by methods known from the literature. The ester forming monomers may be utilized in the polycarbonate containing polymer preparation process. Exemplary ester forming monomers include dicarboxylic acid halides and hydroxycarboxylic acids. The aromatic dicarboxylic acid dihalides used for the production of the aromatic polyester carbonates may be the diacid dichlorides of isophthalic acid, terephthalic acid, diphenyl ether-4,4'-dicarboxylic acid and naphthalene-2,6-dicarboxylic acid. Mixtures of the diacid dichlorides of isophthalic acid and terephthalic in a ratio from about 1:20 to about 20:1 may be used. A carbonic acid halide, such as phosgene, may be used as a difunctional acid derivative during the production of the polyester carbonates. The aromatic polyester carbonates may also contain incorporated hydroxycarboxylic acids. The polyester carbonates may be either linear or may be branched. Branching agents are disclosed hereinabove.

Apart from the monophenols, exemplary chain terminators to produce the aromatic polyester carbonates include chlorocarboxylic acid esters thereof, as well as the acid chlorides of aromatic monocarboxylic acids which may optionally be substituted by $C_1$-$C_{22}$ alkyl groups, or by halogen atoms, and also include aliphatic $C_2$-$C_{22}$ monocarboxylic acid chlorides. The amount of chain terminator may be about 0.1 to about 10 mole percent, with respect to the moles of diphenols in the case of phenolic chain terminators and with respect to the moles of dicarboxylic acid dichlorides in the case of monocarboxylic acid chloride chain terminators.

The polycarbonates or copolymers containing carbonate units may be derived from recycled materials, such as post-consumer recycled materials. The polycarbonates or copolymers containing carbonate units may contain 100 percent recycled materials or may contain any desired mixture of recycled and virgin material. Virgin material as used herein refers to material that has not been previously used. The recycled material may be linear, branched or a mixture thereof. The recycled material may be branched. The recycled material may be in flake form. The recycled material may be recycled from bottles or other structures wherein the used structures are shredded into flake form. The recycled material can be formed into other structures such as pellets. The use of the recycled material in flake form is the most efficient way to utilize the material. The recycled polycarbonates or copolymers containing carbonate units may contain impurities such as polyesters, for instance 0.1 to 1.0 or 0.1 to 0.25 percent by weight based on the recycled polycarbonates or copolymers containing carbonate units.

The composition containing polycarbonates and/or copolymers containing carbonate units may contain a sufficient amount of linear and/or branched polycarbonates and/or copolymers containing carbonate units to provide the desired properties.

The composition containing polycarbonates and/or copolymers containing carbonate units may contain a sufficient amount of linear polycarbonates and/or copolymers containing carbonate units to provide the desired properties as described in this application. The amount of the linear polycarbonates and/or copolymers containing carbonate units may be about 0 percent by weight or greater based on the weight of the polycarbonates and/or copolymers containing carbonate units, 5 percent by weight or greater or about 10 percent by weight or greater. The amount of the linear polycarbonates and/or copolymers containing carbonate units may be about may be about 90 percent by weight or less based on the weight of the polycarbonates and/or copolymers containing carbonate units, 80 percent by weight or less or about 70 percent by weight or less, 40 percent by weight or less, 20 percent by weight or less or about 15 percent by weight or less. Branched polycarbonates and/or copolymers containing carbonate units may comprise the remainder of the polycarbonates and/or copolymers containing carbonate units present in the composition.

The one or more polymers containing carbonate monomer units can comprise polycarbonates, co-polycarbonates or blends thereof. The polycarbonates and/or co-polycarbonates may exhibit a mean weight average molecular weight sufficient to provide the desired properties to articles prepared from the polycarbonates and/or co-polycarbonates as described hereinbefore. The polycarbonates and/or co-polycarbonates may have a mean weight average molecular weights of about 5,000 or greater, about 15,000 or greater or about 20,000 or greater. The polycarbonates and/or co-polycarbonates may have a mean weight average molecular weight of about 50,000 or less, about 45,000 or less, or about 40,000 or less. Unless otherwise indicated, the references to polycarbonate and/or co-polycarbonate "molecular weight" herein refer to weight average molecular weights (Mw) determined by gel permeation chromatography (GPC) using laser scattering techniques with a bisphenol A polycarbonate standard and is given in units of grams per mole (g/mole). The melt flow rate (MFR) of the polycarbonate and/or co-polycarbonate may be sufficient to allow use of the blends to prepare desired articles therefrom. The melt flow rate may be from about 1 to about 30 grams per 10 minutes (g/10 min) as determined at 300° C. under a load of 1.2 kg; determined by ASTM D1238.

The polycarbonates and/or co-polycarbonates may be used in pellet form, flake form, powder form or in a mixture thereof. Where used in powder form the particle size is selected for efficiently blending the materials. The particle size may be about 0.1 mm or greater or about 0.5 mm or greater. The particle size may be about 2.0 mm or less or about 1.5 mm or less.

The polycarbonates and/or copolymers used to prepare the compositions disclosed may have melt flow rates which provide the desired processing properties. The melt flow rates may be about 1 or greater, about 3 or greater, about 5 or greater, about 10 or greater or about 15 or greater. The melt flow rates may be about 30 or less, about 28 or less, about 20 or less, or about 15 or less. A mixture of polycarbonates and/or copolymers containing carbonate units with differing melt flow rates may be used to provide a composite melt flow rate to enhance processing of the compositions disclosed. The mixture of polycarbonates and/or copolymers containing carbonate units having different melt flow rates may contain polycarbonates and/or copolymers containing carbonate units having low melt flow rates and polycarbonates and/or copolymers containing carbonate units having high melt flow rates. Melt flow rates are determined by measuring the grams of a material which passes through a capillary having a diameter of 25.4 mm in a ten-minute period at 300° C. under a load of 1.2, kilograms. The melt flow rates of the disclosed compositions may be about 5 grams/10 minutes or greater, 10 grams/10 minutes or greater or about 15 grams/10 minutes or greater. The melt flow rates of the disclosed compositions may be about 28 grams/10 minutes or less, 20 grams/10 minutes or less or about 10 grams/10 minutes or less. The melt flow rates of the disclosed compositions may be from about 5 grams/10 minutes to about 10 grams/10 minutes.

Vinylidene Substituted Aromatic Compounds

The vinylidene substituted aromatic polymers disclosed herein contain vinylidene substituted aromatic monomers. Vinylidene substituted aromatic monomers comprise vinylidene, alkenyl groups, bonded directly to aromatic structures. The vinylidene substituted aromatic monomers may contain one or more aromatic rings, may contain one or two aromatic rings, or may contain one aromatic ring. The aromatic rings can be unsubstituted or substituted with a substituent that does not interfere with polymerization of the vinylidene substituted aromatic monomers, or the fabrication of the polymers formed into desired structures. The substituents may be halogens or alkyl groups, such as bromine, chlorine or $C_1$ to $C_4$ alkyl groups; or a methyl group. Alkenyl groups comprise straight or branched carbon chains having one or more double bonds, or one double bond. The alkenyl groups useful for the vinylidene substituted aromatic monomers may include those that when bonded to an aromatic ring are capable of polymerization to form copolymers. The alkenyl groups may have 2 to 10 carbon atoms, 2 to 4 carbon atoms or 2 carbon atoms. Exemplary vinylidene substituted aromatic monomers include styrene, alpha methyl styrene, N-phenyl-maleimide and chlorinated styrenes. Exemplary vinylidene substituted aromatic monomers include alpha-methyl styrene and styrene. The vinylidene substituted aromatic monomers may be mono-vinylidene aromatic monomers, which contain one unsaturated group. Vinylidene aromatic monomers include but are not limited to those described in U.S. Pat. Nos. 4,666,987; 4,572,819 and 4,585,825, which are herein incorporated by reference. The monomer may correspond to the formula:

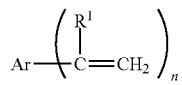

Wherein $R^1$ is separately in each occurrence hydrogen or methyl; and

Ar is separately in each occurrence an aromatic group. Ar may contain one or more aromatic rings, may contain one or two aromatic rings, or may contain one aromatic ring. n is separately in each occurrence 1 to 3, 1 to 2 or 1. The aromatic rings can be unsubstituted or substituted with a substituent that does not interfere with polymerization of the vinylidene substituted aromatic monomers, or the fabrication of the polymers formed into desired structures. The substituents may be halogens or alkyl groups, such as bromine, chlorine or $C_1$ to $C_4$ alkyl groups; or a methyl group. The vinylidene substituted aromatic monomers may be present in the vinylidene substituted aromatic polymers in a sufficient amount such that the vinylidene substituted aromatic polymers exhibit the advantageous properties associated with polymers of vinylidene substituted aromatic monomers, for instance polystyrene. The advantageous properties of vinylidene substituted aromatic polymers include processability, stiffness, and thermal stability. The vinylidene substituted aromatic monomers may be present in an amount of about 40 percent by weight of the polymerizable compositions or vinylidene substituted aromatic polymers or greater, about 50 percent by weight or greater or about 60 percent by weight or greater. The vinylidene substituted aromatic monomers may be present in an amount of about 90 percent by weight of the polymerizable compositions or the vinylidene substituted aromatic polymers or less, about 70 percent by weight or less, or about 80 percent by weight or less, or about 60 percent by weight or less.

The compositions may contain branching agents commonly used in vinylidene aromatic based polymers. The branching agents may be vinylidene substituted aromatic monomers having 2 or more vinylidene groups. Other branching agents may include other difunctional and in general multifunctional (functionality >2) monomers, multifunctional initiators and multifunctional chain transfer agents and the like. The branching agents may be present in polymerizable compositions as described herein in an amount of about 0.001 percent by weight of the composition or greater, about 0.002 percent by weight or greater or about 0.003 percent by weight or greater based on the weight of the polymerizable compositions. The branching agents may be present in polymerizable compositions in an amount of about 0.5 percent by weight of the composition or less, about 0.2 percent by weight or less or about 0.1 percent by weight or less.

The vinylidene substituted aromatic polymers may further comprise one or more unsaturated nitriles. Unsaturated nitriles include, but are not limited to, acrylonitrile, methacrylonitrile, ethacrylonitrile, fumaronitrile and mixtures thereof. The unsaturated nitrile may be acrylonitrile. The unsaturated nitriles are used in the copolymers to enhance the glass transition temperature, transparency, chemical resistance and the like. The vinylidene substituted aromatic polymers disclosed herein may contain one or more unsaturated nitriles in an amount of about 0 percent by weight of the polymerizable compositions or vinylidene substituted aromatic polymers or greater, about 1 percent by weight or greater or about 2 percent by weight or greater. The copolymers disclosed herein may contain one or more unsaturated nitriles in an amount of about 40 percent by weight of the polymerizable compositions or vinylidene substituted aromatic polymers or less, about 35 percent by weight or less, about 30 percent by weight or less or about 20 percent by weight or less.

Other vinyl monomers may also be included in the vinylidene substituted aromatic polymers, in sufficient amount to provide the desired properties as disclosed herein, including conjugated 1,3 dienes (for example butadiene, isoprene, etc.); alpha- or beta-unsaturated monobasic acids and derivatives thereof (for example, acrylic acid, methacrylic acid, etc.); vinyl halides such as vinyl chloride, vinyl bromide, etc.; vinylidene chloride, vinylidene bromide, etc.; vinyl esters such as vinyl acetate, vinyl propionate, etc.; ethylenically unsaturated dicarboxylic acids and anhydrides and derivatives thereof, such as maleic acid, fumaric acid, maleic anhydride, dialkyl maleates or fumarates, such as dimethyl maleate, diethyl maleate, dibutyl maleate, the corresponding fumarates, N-phenyl maleimide (N-PMI), and the like. These additional comonomers can be incorporated into the composition in several ways including, interpolymerization with the vinylidene substituted aromatic containing copolymer and/or polymerization into polymeric components which can be combined, for example blended into the matrix. If present, the amount of such comonomers may be equal to or less than about 20 weight percent, equal to or less than about 10 weight percent or equal to about 5 weight percent based on the total weight of the polymeric composition or vinylidene substituted aromatic polymers. Such co-monomers may be present in an amount of about 1 percent by weight or greater of the polymeric composition or vinylidene substituted aromatic polymers.

The compositions disclosed may contain impact modifiers. The terms impact modifiers and rubbers are used interchangeably. Various impact modifiers may be used in the compositions disclosed; such as diene rubbers, ethylene propylene rubbers, ethylene propylene diene (EPDM) rubbers, ethylene copolymer rubbers, acrylate rubbers, polyisoprene rubbers, silicon rubbers, silicon-acrylate rubbers, polyurethanes, thermoplastic elastomers, halogen containing rubbers, and mixtures thereof. Also suitable are interpolymers of rubber-forming monomers with other copolymerizable monomers. The rubbers may be present in the formulated composition in sufficient amount to provide the desired impact properties to the composition. Desired impact properties include increased izod, charpy, gardner, tensile, falling dart, and the like. The compositions disclosed herein contain impact modifiers (rubbers) in an amount of about 0.5 percent by weight of the compositions or greater, about 1 percent by weight or greater or about 2 percent by weight or greater based on the weight of the polymers and impact modifiers. The compositions disclosed herein contain impact modifiers in an amount of about 50 percent by weight of the compositions or less, about 45 percent by weight or less, about 40 percent by weight or less, about 30 percent by weight or less, about 20 percent by weight or less or about 10 percent by weight or less based on the weight of the polymers and impact modifiers. The compositions disclosed herein contain the polymer blends disclosed herein in an amount of about 0.5 percent by weight of the compositions or greater or 50 percent by weight of the compositions or greater based on the weight of the polymers and impact modifiers. The compositions disclosed herein contain the polymer blends disclosed herein in an amount of about 99.5 percent by weight or less, 90 percent by weight or less, 80 percent by weight or less or 50 percent by weight or less based on the weight of the polymers and impact modifiers. Compositions, formulated compositions, as used in this context are the formulated compositions containing all of the ingredients for the intended use.

The rubbers may be diene rubbers such as polybutadiene, polyisoprene, polypiperylene, polychloroprene, and the like or mixtures of diene rubbers, that is, any rubbery polymers of one or more conjugated 1,3-dienes, such as 1,3-butadiene. Such rubbers include homopolymers of 1,3-butadiene and copolymers of 1,3-butadiene with one or more copolymerizable monomers, such as vinylidene substituted aromatic (styrene). The diene rubber may be the homopolymer of 1,3-butadiene. Exemplary copolymers of 1,3-butadiene are block or tapered block rubbers of at least about 30 weight percent 1,3-butadiene, from about 50 weight percent, from about 70 weight percent, or from about 90 weight percent 1,3-butadiene and up to about 70 weight percent vinylidene substituted aromatic monomer, up to about 50 weight percent, up to about 30 weight percent, or up to about 10 weight percent vinylidene substituted aromatic monomer, weights based on the weight of the 1,3-butadiene copolymer.

The impact modifiers employed may be those polymers and copolymers which exhibit a second order transition temperature, sometimes referred to as the glass transition temperature (Tg), for the diene fragment which is not higher than 0° C. or not higher than −20° C. as determined using conventional techniques, for example ASTM Test Method D 746-52 T. Tg is the temperature or temperature range at which a polymeric material shows an abrupt change in its physical properties, including, for example, mechanical strength. Tg can be determined by differential scanning calorimetry (DSC). The diene rubber may have a cis content equal to or less than 99 percent or less than 97 percent. The cis content of the diene rubber may be equal to or greater than 20 percent or greater than 37 percent wherein the cis weight percent is based on the weight of the diene rubber. The rubber may be a 1,3-butadiene rubber having at least about 1 weight percent 1,2-vinyl or at least about 7 weight percent 1,2-vinyl based on the weight of the 1,3-butadiene rubber. The 1,3-butadiene rubber may have less than or equal to about 30 weight percent 1,2-vinyl or less than or equal to about 13 weight percent 1,2-vinyl based on the weight of the 1,3-butadiene rubber. The diene rubber may have a weight average molecular weight of at least about 100 kilogram per mole (kg/mole) or a weight average molecular weight of at least about a 300 kg/mole. The diene rubber may have a weight-average molecular weight equal to or less than about 900 kg/mole or a weight average molecular weight equal to or less than 600 kg/mole. The diene rubber having a solution viscosity of at least 10 centi Stokes (cSt) (10 percent (%) solution in styrene) or a solution viscosity of about 30 cSt. The diene rubber may have a solution viscosity equal to or less than about 500 cSt or equal to or less than about 400 cSt. The rubber, with graft and/or occluded polymers if present, is dispersed in the continuous matrix phase as discrete particles. The rubber particles may comprise a range of sizes having a mono-modal, bimodal, or multimodal distribution. The average particle size of a rubber particle, as used herein, will, refer to the volume average diameter. the volume average diameter of a group of particles may be the same as the weight average. The average particle diameter measurement generally includes the polymer grafted to the rubber particles and occlusions of polymer within the particles. Unless otherwise specified, the rubber particle sizes disclosed and claimed herein are determined on a Coulter Multisizer II or II e with the ACCUCOMP™ Software Version 2.01. by the following method: about 3 granules of polymer samples (30-70 mg) are dissolved in 5 milliliters (ml) of Dimethyl Formamide (DMF), using an ultrasonic bath for agitation for approximately 15 to 20 minutes. 10 ml of an electrolyte solution (1 percent of $NH_4SCN$ in DMF) is mixed with 0.2 ml of the sample solution. The coulter measuring stand is used with 20 micrometer Coulter tube and a 1.16 micrometer calibration material. The coincidence level indicator of the apparatus should read between 5 and 10 percent. If the reading is above 10 percent, dilute the sample in a beaker with electrolyte solution, or if it is too low, add more drops of the polymer solution in DMF. The volumetric mean particle size is reported. The average particle size of the rubber particles may be equal to or greater than about 0.05 micrometers (microns) (μm), equal to or greater than about 0.1 micrometers, and equal to or greater than about 0.5 micrometers. The average particle size of the rubber particles may be equal to or less than about 10 micrometers, equal to or less than about 5 micrometers, or equal to or less than about 4 micrometers.

As discussed herewith, vinylidene aromatic polymers may be modified with rubbers, such as conjugated dienes. Wherein discussed as such, vinylidene substituted aromatic polymers (e.g., acrylonitrile-butadiene-styrene) may be vinylidene aromatic polymers that are modified with rubbers (e.g., conjugated dienes). The vinylidene substituted aromatic polymers may be produced by any method discussed herein. Vinylidene substituted aromatic polymers may be produced through mass, bulk, emulsion, or the like. The vinylidene substituted aromatic polymers may further add impact modifiers to the vinylidene substituted aromatic polymers by grafting to the backbone of the polymeric compound.

The vinylidene substituted aromatic polymers may be used in pellet form, flake form, or in a mixture thereof.

The vinylidene substituted aromatic polymers may have a desirable melt flow rate during various applications. The mixture of vinylidene substituted aromatic polymers and/or copolymers containing conjugated diene units having different melt flow rates may contain vinylidene substituted aromatic polymers and/or copolymers containing conjugated diene units having low melt flow rates and vinylidene substituted aromatic polymers and/or copolymers containing conjugated diene units having high melt flow rates. The melt flow rate of the vinylidene substituted aromatic polymers may be the same or similar to the melt flow rate of the polycarbonates disclosed herewith. The melt flow rate of vinylidene substituted aromatic polymers may be indicative of the value of molecular weight of the compounds present within. Melt flow rates may indicate that several different conjugated diene rubbers (i.e., the conjugated diene rubbers did not come from the same source) have been used in the polymeric mixture, and a correction is required to attain desirable properties in the compound. Melt flow rates are determined according to ISO 1133-1 at 220° C./10 kg expressed in g/10'. The melt flow rate may be about 40 g/10' or less, about 35 g/10' or less, or about 30 g/or less. The melt flow rate may be about 2.0 g/10' or more, about 3.0 g/10' or more, or about 4.0 g/10' or more. Melt flow rates may be between about 2.0 g/10' and about 40 g/10'.

The vinylidene substituted aromatic polymers may have a desirable molecular weight. The vinylidene substituted aromatic polymers may exhibit a mean weight average molecular weight sufficient to provide the desired properties to articles prepared from the vinylidene substituted aromatic polymers as described hereinbefore. The desired molecular weight of the vinylidene substituted aromatic polymers may be about 250,000 or less, about 220,000 or less, or about 200,000 or less. The molecular weight may be about 50,000 or more, about 75,000 or more, or about 100,000 or more. Molecular weights may be between about 50,000 and about 250,000. Unless otherwise indicated, the molecular weight in reference to vinylidene substituted aromatic polymers is determined by Gel Permeation Chromatography using polystyrene standards and is given in units of grams per mole (g/mole).

Buffers

The compositions disclosed herein contain a buffer system. The buffer system may control the pH of water such that the buffer system positively stabilizes the molecular weight and melt flow rate of the composition. The buffer system may control the pH of water so that the pH is about neutral. The temperature of the water for purposes of determining the pH of the buffer system may be about 25° C. The buffer system may be soluble in water, insoluble in water, partially soluble in water, partially insoluble in water, or any combination herewith. The buffer system may be in a solid state, liquid state, or any state necessary to control the pH of water to about neutral. The buffer system may have a melting point that is higher than the melting point of the polycarbonate, the vinylidene substituted aromatic polymers, or both.

A buffer system as described herewith may be any compound that donates protons (i.e., $H^+$ or hydronium ion), accepts protons (i.e., $H^+$ or hydronium ion), or both. The buffer system may comprise a weak acid and a conjugate base. The buffer system may resist pH changes upon the addition of basic or acidic components. The buffer system may be characterized based on the total number of protons (i.e., $H^+$ or hydronium ion), hydroxyl groups (i.e., hydroxide or $OH^-$), or both. The buffer system may include one or more buffer compounds that are monoprotic, diprotic, triprotic, or polyprotic. The buffer system may proportionally stabilize polycarbonates, vinylidene substituted aromatic polymers, conjugated dienes, or any combination thereof based on the total amount of buffer system present based on the total weight of the composition.

A buffer system as described herewith includes one or more buffers that has an acidic and basic functionality such that the pH of the composition may be directed to about neutral. The buffer system may include one or more buffer compounds, two or more buffer compounds, three or more buffer compounds, or a plurality of buffer compounds. The buffer system may comprise a single compound. More than one buffer compound may be more effective at attaining a neutral pH than a single buffer compound. The buffer system may comprise a pair of compounds. The buffer system may include an inorganic compound, an organic compound, or both. The buffer system may include a counterion.

The buffer system is a present in a concentration (i.e., percentage by weight of the total composition) sufficient to facilitate improved molecular weight stability of polycarbonate, vinylidene substituted aromatic polymers, or both. Higher concentrations of the buffer system than described herewith may disrupt the manufacturing, polymerization, compounding, or any combination thereof of the composition. Lower concentrations of the buffer system than described herewith may have a negligible effect on the overall composition. Lower concentration of the buffer system than described herewith may not control the pH sufficiently to maintain enhanced molecular weight stability. Lower concentrations of the buffer system than described herewith may not control the pH sufficiently to maintain stable melt flow rates.

The buffers system may include a buffer compound that is an inorganic compound or organic compound that balances the pH of the composition such that the optimal copolymerization and compounding is achieved. Inorganic compounds may include compounds that are free of saturated carbons (i.e., free of C—H bonds). The inorganic compounds may include carbon atoms that do not include hydrogen bonds. Organic compounds may include compounds that contain saturated carbons (i.e., contains C—H bonds). The buffer compounds may include acetates, sulfonates, phosphates, ammonia, formates, or any combination thereof. The buffer system may include buffer compounds that are aromatic or aliphatic. The buffer system may include pairs of buffer compounds that are weak acids and conjugate bases. The buffer system may include a single buffer compound. The buffer system may include one or more buffer compounds, two or more buffer compounds, three or more buffer compounds, or a plurality of buffer compounds. The buffer compounds may be chosen based on a pKa that is about neutral. The buffer compounds may control the pH of water to about neutral. The buffer system may include a Good's buffer. Organic compounds may include 2-(N-morpholino) ethanesulfonic acid (MES), 2-[Bis(2-hydroxyethyl)amino]-2-(hydroxymethyl)propane-1,3-diol (Bis-Tris Methane), 2-[(2-amino-2-oxoethyl)-(carboxymethyl)amino]acetic acid (ADA), N-(2-Acetamido)-2-aminoethanesulfonic acid (ACES), piperazine-N,N'-bis(2-ethanesulfonic acid) (PIPES), 2-Hydroxy-3-morpholinopropanesulfonic acid (MOPSO), 1,3-bis(tris(hydroxymethyl)methylamino)propane (Bis-6-Tris Propane), N—N-Bis(2-hydroxyethyl)-2-aminoethanesulfonic acid (BES), MOPS, 2-[[1,3-dihydroxy-2-(hydroxymethyl)propan-2-yl]amino]ethanesulfonic acid (TES), 4-(2-hydroxyethyl)-1-piperazineethanesulfonic acid (HEPES), 3-(N,N-Bis[2-hydroxyethyl]amino)-2-hydroxypropanesulfonic acid (DIPSO), 4-(N-Morpholino)butanesulfonic acid (MOBS), 3-[[1,3-dihydroxy-2-(hydroxymethyl)propan-2-yl]amino]-2-hydroxypropane-1-sulfonic acid (TAPSO), 4-(2-Hydroxyethyl)piperazine-1-(2-hyrdoxypropansulfonic acid) (HEPPSO), POPSO, 3-[4-(2-Hydroxyethyl)piperazin-1-yl]propane-1-sulfonic acid (EPPS or HEPPS), N-(2-Hydroxy-1,1-bis(hydroxymethyl)ethyl)glycine (Tricine), Glycyl-glycine (Gly-Gly), 2-(Bis(2-hydroxyethyl)amino)acetic acid (Bicine), N-(2-Hydroxyethyl)piperazine-N'-(4-butanesulfonic acid) (HEPBS), [tris (hydroxymethyl)methylamino]propanesulfonic acid (TAPS), 2-Amino-2-methyl-1,3-propanediol (Ammediol or AMPD), N-tris(Hydroxymethyl)methyl-4-aminobutanesulfonic acid (TABS), N-(1,1-Dimethyl-2-hydroxyethyl)-3-amino-2-hydroxypropanesulfonic acid (AMPSO), N-Cyclohexyl-2-aminoethanesulfonic acid (CHES), 3-(Cyclohexylamino)-2-hydroxy-1-propanesulfonic acid (CAPSO), 2-Amino-2-methylpropan-1-ol (Aminomethyl propanol or AMP), N-cyclohexyl-3-aminopropanesulfonic acid (CAPS), 4-(Cyclohexylamino)-1-butanesulfonic acid (CABS), or any combination thereof. Inorganic compounds include metal phosphates, metal sulfonates, metal acetates, metal formats, and the like. Exemplary inorganic compounds include monosodium phosphate, disodium phosphate, the like, or any combination thereof.

The buffer system may include a counterion that is an anion or a cation that balances the buffer system when compounded in the polymeric compositions. The counterion may be any compound sufficient to balance the charge of the opposite compound in a buffer system. The counterion may be positively or negatively charged. The counterion may be paired with a compound that has an opposite charge. A counterion that is positively charged may be paired with a negatively charged compound, and a counterion that is negatively charged may be paired with a positively charged compound. The counterion may be a metal. The counterion may be lipophilic. Metals may be any metal, examples include sodium, potassium, calcium, and the like, or any combination thereof.

The composition may include any amount of buffer system sufficient to control the pH to about neutral and positively impact the stability of the polymer compositions disclosed herein. The percentage of buffer system herewith may include all buffers present in the composition. The total amount of buffer system present may be the sum of one or more buffer compounds, two or more buffer compounds, three or more buffer compounds, or a plurality of buffer compounds. The buffer system may be present in the composition in an amount of about 0.005 percent by weight or more, about 0.010 percent by weight or more, about 0.015 weight percent or more, about 0.020 weight percent or more, or about 0.025 weight percent or more. The buffer system may be present in the composition in an amount of about 0.050 weight percent or less, about 0.045 weight percent or less, about 0.040 weight percent or less, about 0.035 weight percent or less, or about 0.030 weight percent or less. The buffer system may be present in the composition in an amount of about 0.010 percent by weight to about 0.030 percent by weight or about 0.035 percent by weight.

The total amount of the buffer system, the vinylidene substituted aromatic polymer, and the polycarbonate in the polymeric composition may be about 80 weight percent or more, about 90 weight percent or more, about 95 weight percent or more, or about 97 weight percent or more, based on the total weight of the polymeric composition. The total amount of buffer system, vinylidene substituted aromatic polymer, and polycarbonate may be about 100 or less, about 99.9 or less, about 99 or less, or about 98 or less. The total amount of the buffer system, the rubber-modified vinylidene substituted aromatic polymer, and the polycarbonate in the polymeric composition may be about 99.9 weight percent or less, based on the total weight of the polymeric composition.

The pKa or the pH of the buffer system may be determined by the Henderson-Hasselbalch equation, formulated as $$\text{pH} = pK_a + \log\left(\frac{A^-}{HA}\right).$$

The buffer system may control the pH of the water to about neutral such that desirable polymerization or compounding of the one or more polymeric composition is achieved. The pH that is neutral as described herein may mean that the acidic and basic functionalities of the buffer system, polycarbonate, or vinylidene substituted aromatic polymer are effectively cancelled out. The pH that is neutral as described herein may mean that the acidic and basic functionalities of the buffer system, polycarbonate, or vinylidene substituted aromatic polymer are effectively in equal proportions. The pH that is neutral as described herein may mean that the free protons (i.e., $H^+$ or hydronium ion) and hydroxyl groups (i.e., hydroxide or $OH^-$) are effectively at even concentrations. The desired pH may be about 8.0 or less, about 7.8 or less, about 7.6 or less, about 7.4 or less, or about 7.2 or less. The desired pH may be about 6.0 or more, about 6.2 or more, about 6.4 or more, about 6.6 or more, or about 6.8 or more. The pH may be about 6.8. to about 7.2.

The buffer system may have a pKa that is about neutral such that the buffer system pushes either a basic or acidic composition to a neutral state. The buffer system may have a pKa that pushes the acidity, basicity, or both of the compositions disclosed herein to a pH that is about neutral. A pKa that is about neutral may be 10.0 or less, 9.0 or less, 8.0 or less, or 7.5 or less. A pKa that is about neutral may be 4.0 or more, 5.0 or more, 6.0 or more, or 6.5 or more. In one embodiment, the pKa of a buffer system may be about 6.5 to about 7.5. The pKa of a buffer system may be about 6.8 to about 7.2.

The buffer system is blended/compounded with the polycarbonate and vinylidene substituted aromatic polymer to mitigate undesirable molecular weight, melt flow rates, or both from the addition of polymers with varying properties. The buffer system is included in the process of compounding the polycarbonates and the vinylidene substituted aromatic polymers. The buffer system may be blended with the polymeric composition at any time sufficient to enhance any of the properties of the overall polymeric composition. The buffer system may be blended with the polymeric composition at one or more stages of the compounding process. The methods disclosed herewith can contact the buffer system with the vinylidene substituted aromatic polymer, the polycarbonate, or both at any time sufficient to enhance the properties or process to make the polymeric composition.

The buffer system may push the basicity, acidity, or both to a pH that is about neutral such that the molecular weight of the composition is enhanced. The buffer system may push the basicity, acidity, or both to a pH that is about neutral such that the melt flow rate of the composition is enhanced. The buffer system may push the basicity, acidity, or both to a pH that is about neutral such that the melt flow rate and the molecular weight of the composition is enhanced. The buffer system may enhance the stability of the polycarbonate, vinylidene substituted aromatic polymers, or both such that the color stability is enhanced. Compositions based on conjugated dienes and polycarbonates from multiple sources may be utilized. More than one vinylidene substituted aromatic polymers containing conjugated dienes may be produced from conjugated dienes that are provided by different sources, which may result in inconsistent properties. More than one polycarbonate may be blended with more than on polycarbonate that may hail may be provided by different sources, which may result in inconsistent properties of the overall blend of polycarbonates. One reason for the inconsistent properties in blends of polycarbonates and vinylidene substituted aromatic polymers is that the different sources may use different materials to produce polycarbonates and vinylidene substituted aromatic polymers. The buffer system may stabilize the inconsistent properties by pushing a basic or acidic polymeric composition to a pH that is about neutral. The buffer system may push a basic or acid polymeric composition to a pH that is about neutral at any time during compounding, polymerizing, blending, or the like such that the overall blend of polycarbonates and vinylidene substituted aromatic polymers have stabilized properties (i.e., stabilized molecular weight, melt flow rate, or color).

Polycarbonate and Vinylidene Substituted Aromatic Polymers

The polymeric composition includes a plurality of polymers. As discussed hereinbefore, the plurality of polymers includes the polycarbonate and vinylidene substituted aromatic polymers for example acrylonitrile-butadiene-styrene "ABS". Although the polymeric composition may include additional polymers, other polymers are typically present as minor components in the polymeric composition. The total amount of the polycarbonate and the vinylidene substituted aromatic polymers may be about 70 weight percent or more, about 80 weight percent or more, about 90 weight percent or more, or about 95 weight percent or more, based on the total weight of the polymers in the polymeric composition.

The total weight of the polymers in the polymeric composition may be about 75 weight percent or more, about 83 weight percent or more, or about 88 weight percent or more. The total weight of the polymers in the polymeric composition may be about 99.9 weight percent or less, about 99 weight percent or less, or about 98 weight percent or less, based on the total weight of the polymeric composition.

The polycarbonate is present in an amount of about 10 weight percent or more, about 20 weight percent or more, about 25 weight percent or more, about 28 weight percent or more, or about 30 weight percent or more, based on the total weight of the polymeric composition, and/or based on the total weight of the polymers in the polymeric composition. The polycarbonate may be present in an amount of about 90 weight percent or less, about 85 weight percent or less, about 80 weight percent or less, about 75 weight percent or less, about 70 weight percent or less, or about 65 weight percent or less or about 60 weight percent or less, based on the total weight of the polymeric composition, and/or based on the total weight of the polymers in the polymeric composition.

The amount of the vinylidene substituted aromatic polymer, for example the amount of the rubber-modified vinylidene substituted aromatic polymer and any additional impact modifier and/or vinylidene substituted aromatic polymers and unsaturated nitriles may be about 90 weight percent or less, about 80 weight percent or less, about 75 weight percent or less, or about 70 weight percent or less, based on the total weight of the polymeric composition and/or based on the total weight of the polymers in the polymeric composition. The vinylidene substituted aromatic polymer may be present in an amount of about 0.05 weight percent or more, 10 weight percent or more, about 15 weight percent or more, about 20 weight percent or more, about 25 weight percent or more, or about 35 weight percent or more based on the total weight of the polymeric composition and/or based on the total weight of the polymers in the polymeric composition.

The concentration of the impact modifier (e.g., the conjugated diene or the polybutadiene) is about 3 weight percent or more, about 5 weight percent or more, or about 7 weight percent or more, based on the total weight of the polymeric composition. The concentration of the impact modifier (e.g., the conjugated diene or the polybutadiene) is about 23 weight percent or less, about 20 weight percent or less, about 18 weight percent or less, about 15 weight percent or less, or about 14 weight percent or less, based on the total weight of the polymeric composition.

If employed, any additional copolymer of unsaturated nitriles and vinylidene substituted aromatic monomer (i.e., other than the copolymer in the rubber-modified vinylidene substituted aromatic compound), is about 25 weight percent or less, about 20 weight percent or less, about 15 weight percent or less, or about 10 weight percent or less, based on the total weight of the thermoplastic composition. Such additional copolymer of unsaturated nitriles and vinylidene substituted aromatic monomer may be present in an amount of about 0 weight percent or more or about 1 percent by weight or more. The ratio of the weight of such additional copolymer of unsaturated nitriles and vinylidene substituted aromatic monomer to the weight of the rubber-modified vinylidene substituted aromatic compound is about 1.0 or less, about 0.8 or less, about 0.6 or less, or about 0.45 or less.

Some or all of the rubber-modified vinylidene substituted aromatic polymers in a composition may be replaced with the combination of i) a copolymer of unsaturated nitriles and vinylidene substituted aromatic monomers (SAN) (such as described herein); and ii) a rubber modifier (e.g. the conjugated diene). The amount of rubber modifier is about 2 percent or more, about 3 percent or more, or about 4 percent or more. The amount of conjugated diene is about 30 percent or less, about 20 percent or less, or about 15 percent or less. The rubber modifier may include any polymer having a glass transition temperature of about 0° C. or less. The rubber modifier may impart ductility to the SAN copolymer. Some embodiments of rubber modifier includes butadiene monomer, styrene monomer, or both. The rubber modifier may include a sufficient amount of vinylidene substituted aromatic monomer for improving the compatibility of the rubber modifier with the SAN copolymer. The rubber modifier may be a copolymer including butadiene and styrene.

The rubber modifier may be a core shell polymer. The rubber modifier may include a core including or consisting essentially of a polymer including butadiene and styrene. The rubber modifier may have a shell including an acrylate monomer. The rubber modifier may have a shell including polymethyl methacrylate. The rubber modifier may be a core shell MBS modifier including a poly (butadiene/styrene) core and a polymethyl methacrylate shell. The rubber modifier may be provided as an emulsion ABS and/or a grafted rubber concentrate. The amount of elastomer in the grafted rubber concentrates may be about 20 weight percent or more, about 30 weight percent or more, about 45 weight percent or more, or about 55 weight percent or more, based on the total weight of the grafted rubber concentrate. The grafted rubber concentrate may be grafted on an SAN copolymer (e.g., produced by an emulsion process). The grafted rubber concentrate may consist of (i.e., about 95 weight percent or more), or entirely of one or more elastomers (e.g., butadiene) and one or more styrene containing polymers (e.g., SAN). The grafted rubber concentrate may be added separately to the polymeric composition, e.g., with additional SAN copolymer. The grafted rubber concentrate may be mixed with additional styrene containing polymer (e.g., SAN copolymer) prior to adding to the polymeric composition. The rubber modifier may include a copolymer (e.g., an SAN copolymer or an ABS polymer) that further includes one or more alkyl acrylates. Alkyl acrylates for the copolymer can include methyl acrylate, ethyl acrylate, propyl acrylate, butyl acrylate (e.g., n-butyl acrylate), and hexyl acrylate. The vinylidene substituted aromatic compounds may include the residual content of ABS polymers within the composition.

The total amount of the reinforcing filler, the vinylidene substituted aromatic polymers, and the polycarbonate in the polymeric composition may be about 80 weight percent or more, about 90 weight percent or more, about 95 weight percent or more, or about 97 weight percent or more, based on the total weight of the polymeric composition. The total amount of the reinforcing filler, the rubber-modified vinylidene substituted aromatic polymers, and the polycarbonate in the polymeric composition may be about 99.9 weight percent or less, based on the total weight of the polymeric composition.

The blend of polycarbonates and vinylidene substituted aromatic polymers may be used in pellet form, flake form or in a mixture thereof.

The blends of polycarbonates and vinylidene substituted aromatic polymers may have a desirable melt flow rate during various applications. The melt flow rate of blends of polycarbonates and vinylidene substituted aromatic polymers may be indicative of the value of molecular weight of the polymers present within. Melt flow rate may indicate that several different polycarbonates and the conjugated diene rubbers (i.e., the different polycarbonates and different conjugated diene rubbers did not come from the same source) have been used in the polymeric compound, and a correction is required to attain desirable properties in the compound. A specific amount of buffer system is added to the blends of polycarbonates and vinylidene substituted aromatic polymers to attain desirable melt flow rates.

Methods

The compositions disclosed may be produced by mixing the components in a known manner and melt-compounding and/or melt-extruding them at temperatures of from 200° C. to 300° C. in conventional units such as internal kneaders, extruders and twin-screw extruders. The individual components may be mixed in a known manner both in succession and simultaneously and both at approximately 23° C. (room temperature) and at a higher temperature.

Disclosed are various techniques for producing the copolymers. Examples of these known polymerization processes include bulk, mass-solution, or mass-suspension polymerization, generally known as mass polymerization processes. For a good discussion of how to make vinylidene substituted aromatic polymers containing compositions see "Modern Styrenic Polymers" of Series In Polymer Science (Wiley), Ed. John Scheirs and Duane Priddy, ISBN 0 471 497525. Also, for example, U.S. Pat. Nos. 3,660,535; 3,243,481; and 4,239,863, which are incorporated herein by reference. Continuous mass polymerization techniques are advantageously employed in preparing the vinylidene substituted aromatic polymers. The polymerization may conducted in one or more substantially linear, stratified flow or so-called "plug-flow" type reactors such as described in U.S. Pat. No. 2,727,884, sometimes referred to as multizone plug flow bulk process, which may or may not comprise recirculation of a portion of the partially polymerized product or, alternatively, in a stirred tank reactor wherein the contents of the reactor are essentially uniform throughout, which is generally employed in combination with one or more plug-flow type reactors. The stirred tank reactors can be boiling and/or coil reactors. Such reactors can be used in series. Processes for use of the stirred tank reactors for preparing vinylidene substituted aromatic polymers are disclosed in *Modern Styrenic Polymers*, Edited by John Schiers and Duane Priddy, Wiley, ISBN 0 471 49752 5, published in 2003, see pp 43-72, relevant portions incorporated herein by reference. Alternatively, a parallel reactor set-up, as taught in EP 412801, may also be suitable for preparing the copolymers, relevant portions are incorporated herein by reference.

Polycarbonates may be produced by interfacial polymerization as generally described herewith. The polycarbonates may be produced by any known method for polymerization of polycarbonates.

The disclosed compositions may be molded using procedure known in the art. The compositions may be molded into useful shaped articles by a variety of means such as injection molding, over molding, extrusion, rotational molding, blow molding and thermoforming to form various molded articles. Such articles may include thin-walled articles for consumer goods like cellphones, MP3 players, computers, laptops, cameras, video recorders, electronic tablets, hand receivers, kitchen appliances, electrical housings, etc., e.g. a smart meter housing, and the like; electrical connectors, and components of lighting fixtures, ornaments, home appliances, roofs, greenhouses, sun rooms, swimming pool enclosures, Light Emitting Diodes (LEDs) and light panels, extruded film and sheet articles; electrical parts, such as relays; and telecommunications parts such as parts for base station terminals. The present disclosure further contemplates additional fabrication operations on said articles, such as, but not limited to, molding, in-mold decoration, baking in a paint oven, lamination, and/or thermoforming. The compositions disclosed are heated to temperatures at which the composition flows, which may be above the glass transition temperatures of the polycarbonates in the composition. Such temperatures may be greater than 155° C., above 200° C. or greater, 250° C. or greater. Such temperatures may be 400° C. or less or 300° C. or less. The mold may be heated to facilitate processing such as to 60° C. or greater, 80° C. or greater or 100° C. or greater.

Additives

The disclosed compositions may also optionally contain one or more additives that are commonly used in compositions of this type. Such additives of this type include, but are not limited to: fillers, fibers, ignition resistant additives, thermal stabilizers, UV absorbers, light stabilizers, light diffusing agents, pigments, dyes, colorants, antioxidants, antistats, silicon oils, flow enhancers, mold releases, etc. Additionally, ignition resistance additives, such as, but not limited to halogenated hydrocarbons, halogenated carbonate oligomers, halogenated diglycidyl ethers, organophosphorous compounds, fluorinated olefins, antimony oxide and metal salts of aromatic sulfur, or a mixture thereof may be used. Compounds which stabilize mass polymerized rubber-modified vinylidene substituted aromatic copolymer compositions against degradation caused by, but not limited to heat, light, and oxygen, or a mixture thereof may be used. Fillers and reinforcements may also be present. Fillers include talc, clay, wollastonite, mica, glass or a mixture thereof. If used, such additives and/or fillers may be present in the formulated compositions in an amount about 0.01 percent by weight or greater, about 0.1 percent by weight or greater, about 1 percent by weight or greater, about 2 percent by weight or greater, or about 3 percent by weight or greater based on the weight of the compositions. The additives and/or fillers may be present in an amount of about 40 percent by weight or less, about 30 percent by weight or less, about 20 percent by weight or less, about 15 percent by weight or less, about 10 percent by weight or less, about 5 percent by weight or less based on the weight of the composition. The additives may be present in amounts up to 5 weight percent while fillers may be present in amounts up to 40 weight percent based on the weight of the compositions. The polymeric composition may be substantially free or entirely free of fillers and/or additives so that the low density of the selected polymers is generally maintained. Examples of additives that may be employed include the additives described in US Patent Application Publication 2013/0196130A1 (by Hufen et al., published Aug. 1, 2013, see e.g., paragraphs 0144 through 0147), incorporated herein by reference. One or more of the additives may be blended with polycarbonate prior to adding them to the mixing system. The polycarbonate may be in powder form.

The compositions disclosed herein may include an UV absorber (i.e., UV stabilizers) that in one more embodiment function to stabilize the color of the composition. When UV absorbers are added, the polycarbonates, vinylidene substituted aromatic compounds, or both may absorb light energy from UV rays as heat. UV absorbers may reduce weathering in polymeric compositions, such as compositions of polycarbonates and vinylidene substituted aromatic compounds. UV absorbers may include benzotriazoles, hydroxyphenyl-triazines, benzophenoses, s-triazines, the like, or any combination thereof. UV absorbers may be present in an amount of about 500 ppm or more, about 1,000 ppm or more, or about 1,500 ppm or more. UV absorbers may be present in about 10,000 ppm or less, about 8,000 ppm or less, or about 6,000 ppm or less. UV absorbers may be present in an amount of about 500 ppm to about 10,000 ppm.

If employed, the fillers may include or consist essentially of reinforcing fillers, such as fibers having a length to diameter ratio of about 4 or more. The amount of other fillers (e.g., non-reinforcing fillers, such as talc, clay, etc.) may be about 6 weight percent or less, about 4 weight percent or less, about 2 weight percent or less, or about 1 weight percent or less, based on the total weight of the polymeric composition. A reinforcing filler may be employed for improving the strength of the polymeric composition and/or for reducing the coefficient of linear thermal expansion of the composition. The reinforcing filler may include a glass fiber, a carbon fiber, a metal fiber, or any combination thereof. Other reinforcing fillers include mineral fillers having a needle-like structure (i.e., acicular structure), such as wollastonite.

The median diameter of the acicular structures may be about 5 microns or more, 10 microns or more, 15 microns or more, or 20 microns or more. The median diameter may be 60 or less, 50 or less, 40 or less, or 30 or less. Acicular structures are defined by their aspect ratios. The aspect ratios may be about 2:1 or more, about 4:1 or more, about 6:1 or more, about 10:1 or more or about 14:1 or more. Conversely, high aspect ratios may be about 44:1 or less; 20:1 or less, 15:1 or less, or 10:1 or less. The aspect ratios may be determined by a ratio of length relative to diameter (i.e., aspect ratio=length:diameter), US 2006/0036012A paragraph 0004 and U.S. Pat. No. 7,001,944B2 Column 1 lines 39 to 50, relevant portions incorporated herein by reference. The acicular structure measurements may be determined by microscopic examination of fibers as described in as described in US 2018/0340051 paragraph 0016 and THE EFFECT OF WOLLASTONITE MICRO-FIBRE ASPECT RATIO ON REINFORCEMENT OF PORTLAND CEMENT-BASED BINDERS, M. P. Norman available at http://www.canadianwollastonite.com/wp-content/uploads/2018/02/Effect-Of-Wollastonite-Micro-Fibre-Aspect-Ratio-On-Reinforcement-Of-Portland-Cement-Based-Binders.pdf, and U.S. Pat. No. 9,028,946 B2, column 5 lines 14 to 21, relevant portions incorporated herein by reference. Specifically, scanning electron microscope (SEM) at 200×, 500×, or 1000× magnification may be useful for ascertaining measurements and subsequent aspect ratios. Length and diameter measurements may then be taken using known methods, mean average length and aspect ratio are then calculated in known manner from the individual fiber measurements, and aspect ratios may be subsequently calculated. A number of websites provide aspect ratio calculators, which are well known to the skilled artisan. Reinforcing filler suppliers publish the aspect ratios of their fillers and many users rely on the published aspect ratios from the suppliers, see U.S. Pat. No. 7,001,944 and US2006/0036012, incorporated herein by reference. In samples, high purity reinforcing fillers, such as wollastonite, may be desirable including about 96% pure or more, 97% pure or more, 98% pure or more, or 99% pure or more.

Disclosed are formed articles comprising the disclosed compositions. Exemplary formed articles include interior trim for rail vehicles, interior and/or exterior automotive article, enclosures for electrical devices containing small transformers, enclosures for information dissemination and/or transmission devices, enclosures and/or cladding for medical purposes, message devices and/or enclosures therefore, toy vehicles for children, sheet wall elements, enclosures for safety equipment, hatchback spoilers, thermally insulated transport containers, apparati for keeping and/or caring for small animals, articles for sanitary and/or bathroom installations, cover grills for ventilation openings, articles for summer houses and sheds, and/or enclosures for garden appliances. Exemplary fabricated articles include an instrument housing or enclosure such as for: a power tool, an appliance, a consumer electronic equipment such as a TV, a VCR, a DVD player, a web appliance, an electronic book, etc., or an enclosure for information technology equipment such as a telephone, a computer, a monitor, a fax machine, a battery charger, a scanner, a copier, a printer, a hand held computer, a flat screen display, and the like.

EMBODIMENTS

1. A composition comprising: a) one or more polycarbonates; b) one or more vinylidene aromatic substituted polymers; and c) a buffer system that controls the pH in water at 25° C. at a value of about 6.0 to about 8.0.

2. The composition according to embodiment 1, wherein the buffer system has a pKa between about 4 and about 10.

3. The composition according to any one of the preceding embodiments comprising: a) from about 10 or about 50 to about 95 percent by weight of the one or more polycarbonates; b) from about 0.5 or about 50 to about 50 or about 90 percent by weight of the one or more vinylidene aromatic substituted polymers; and c) from about 0.005 about 0.010 percent to about 0.035 or about 0.050 percent by weight of the buffer system; wherein weight is based on the total weight of the composition.

4. The composition according to any one of the preceding embodiments, wherein the buffer system is present in an amount from about 0.020 percent to about 0.040 percent by weight.

5. The composition according to any one of the preceding embodiments, wherein the vinylidene aromatic substituted polymers comprises: a) from about 5 to about 40 percent by weight of one or more unsaturated nitriles; b) from about 1 to about 70 percent by weight of one or more conjugated dienes; and c) from about 25 to about 94 percent by weight of the one or more vinylidene aromatic substituted monomers.

6. The composition according to any one of the preceding embodiments, wherein the buffer system comprises an inorganic buffer, an organic buffer, or both.

7. The composition according to any one of the preceding embodiments, wherein the buffer system comprises a counterion that may be any metal including sodium, potassium, calcium, a similar counterion, or any combination thereof.

8. The composition according to any one of the preceding embodiments, wherein the buffer system comprises acetates, sulfonates, phosphates, ammonia, formates, or any combination thereof.

9. The composition according to any one of the preceding embodiments, wherein the buffer system comprises a Good's buffer.

10. The composition according to any one of the preceding embodiments, wherein the buffer system is MES, Bis-Tris Methane, ADA, ACES, PIPES, MOPSO, Bis-6-Tris Propane, BES, MOPS, TES, HEPES, DIPSO, MOBS, TAPSO, HEPPSO, POPSO, EPPS or HEPPS, Tricine, Gly-Gly, Bicine, HEPBS, TAPS, AMPD, TABS, AMPSO, CHES, CAPSO, AMP, CAPS, CABS, or any combination thereof.

11. The composition according to any one of the preceding embodiments, wherein the buffer system has a pKa of about 5.0 to about 9.0.

12. The composition according to any one of the preceding embodiments, wherein the buffer system has a pKa of about 6.5 to about 7.5.

13. The composition according to any one of the preceding embodiments, wherein the buffer system has a pKa of about 6.8 to about 7.2.

14. The composition according to any one of the preceding embodiments, wherein the composition further comprises an additive including fillers, fibers, thermal stabilizers, UV absorbers, light stabilizers, light diffusing agents, mold release agents, colorants, pigments, dyes, or any other additive.

15. The composition according to any one of the preceding embodiments, wherein the composition comprises an impact modifier.

16. The composition according to any one of the preceding embodiments, wherein the polycarbonate is branched.

17. The composition according to any one of the preceding embodiments, wherein the polycarbonate is linear.

18. The composition according to any one of the preceding embodiments, wherein the one or more polycarbonates comprise post-consumer recycled polycarbonate.

19. The composition according to any one of the preceding embodiments, wherein the one or more polycarbonates comprise post-consumer recycled polycarbonate and virgin polycarbonate.

20. The composition according to any one of the preceding embodiments, wherein the one or more polycarbonates comprise post-consumer recycled polycarbonate.

21. The composition according to any one of the preceding embodiments, wherein the one or more polycarbonates comprise post-consumer recycled polycarbonate and two or more virgin polycarbonates having different melt flow rates.

22. The composition according to any one of the preceding embodiments, wherein the one or more polycarbonates comprise one or more virgin polycarbonates that is branched and one or more virgin polycarbonates that is linear.

23. The composition according to any one of the preceding embodiments, wherein the one or more vinylidene aromatic substituted polymers comprises post-consumer recycled conjugated dienes.

24. The composition according to any one of the preceding embodiments, wherein the one or more vinylidene aromatic substituted polymers comprises post-consumer recycled conjugated dienes and virgin conjugated dienes.

25. The composition according to any one of the preceding embodiments, wherein the one or more vinylidene aromatic substituted polymers comprises post-consumer recycled conjugated dienes and two or more virgin conjugated dienes having different melt flow rates.

26. The composition according to any one of the preceding embodiments, wherein the one or more vinylidene aromatic substituted polymers comprises one or more virgin conjugated dienes that is branched and one or more virgin conjugated dienes that is linear.

27. The composition according to any one of the preceding embodiments, wherein the composition is essentially free of phosphoric acid.

28. The composition according to any one of the preceding embodiments, wherein the one or more unsaturated nitriles comprise acrylonitrile, methacrylonitrile, ethacrylonitrile, fumaronitrile or mixtures thereof.

29. The composition according to any one of the preceding embodiments, wherein the one or more conjugated dienes comprise conjugated 1,3 dienes (for example butadiene, isoprene, etc.); alpha- or beta-unsaturated monobasic acids and derivatives thereof (for example, acrylic acid, methacrylic acid, etc.); vinyl halides such as vinyl chloride, vinyl bromide, etc.; vinylidene chloride, vinylidene bromide, etc.; vinyl esters such as vinyl acetate, vinyl propionate, etc.; ethylenically unsaturated dicarboxylic acids and anhydrides and derivatives thereof, such as maleic acid, fumaric acid, maleic anhydride, dialkyl maleates or fumarates, such as dimethyl maleate, diethyl maleate, dibutyl maleate, the corresponding fumarates, N-phenyl maleimide (N-PMI) or mixtures thereof.

30. The composition according to any one of the preceding embodiments, wherein the one or more vinylidene aromatic substituted monomers comprise styrene, alpha methyl styrene, N-phenyl-maleimide and chlorinated styrenes; or alpha-methyl styrene.

31. A method according to embodiments 1-30 comprising: a) mixing the one or more polycarbonates, the one or more vinylidene aromatic substituted polymers, and the buffer system; and b) extruding the mixed polymer.

32. The method according to embodiment 31, wherein the one or more vinylidene aromatic substituted polymers are polymerized by a mass polymerization process comprising: a) cutting or chopping the one or more polymers of conjugated dienes; b) mixing the one or more polymers of conjugated dienes (such as polybutadienes), the one or more unsaturated nitriles, and the one or more vinylidene aromatic substituted monomers; b) polymerizing the one or more polymers of conjugated dienes (such as polybutadienes), the one or more unsaturated nitriles, and the one or more vinylidene aromatic substituted monomers; c) degassing the one or more vinylidene aromatic substituted polymera and recycling volatile monomers; and d) pelletizing the one or more vinylidene aromatic substituted polymers.

33. The method according to embodiment 31 or 32, wherein the one or more polycarbonates are produced using an interfacial polymerization process.

34. The method according to embodiments 31-34, wherein the one or more polycarbonates and at least a portion of the buffer system contact before contacting the one or more vinylidene aromatic substituted polymers.

35. The method according to embodiments 31-34, wherein the one or more vinylidene aromatic substituted polymers are one or more acrylonitrile butadiene styrene polymers.

36. An article according to any one of embodiments 1-35, wherein the composition is a molded structure.

37. A method according to embodiment 36 comprising melting the composition, injecting the melted composition into a mold in a molten form, cooling the composition to form a molded structure, and removing the molded structure from the mold.

ILLUSTRATIVE EMBODIMENTS

The following examples are provided to illustrate the disclosed materials but are not intended to limit the scope thereof. All parts and percentages are by weight unless otherwise indicated.

Ingredients Polycarbonate one (PC1) is a polycarbonate having a melt flow rate of 9.2 and a molecular weight of 28,200.

Polycarbonate two (PC2) is a polycarbonate with 2 ppm $H_3PO_4$ having a melt flow rate of 14.2 and a molecular weight of 26,000.

Polycarbonate three (PC3) a polycarbonate with a melt flow rate of 10.2 and a molecular weight of 27,400.

Polycarbonate four (PC4) is a linear polycarbonate having some base contamination with a melt flow rate of 8.2 and a molecular weight of 28,400.

Acrylonitrile-butadiene-styrene one (ABS1) is an ABS resin with an MFR at 220° C./10.0 kg (measured by an ISO 1133) and a density of 1.05 g/cm$^3$ (measured by an ISO 1183/B) that is modified with a linear low cis polybutadiene rubber 1 having a Mooney Viscosity of 55. Acrylonitrile-butadiene-styrene two (ABS2) is an ABS resin with an MFR at 220° C./10.0 kg (measured by an ISO 1133) and a density of 1.05 g/cm$^3$ (measured by an ISO 1183/B) that is modified with a linear low cis polybutadiene rubber 2 having a Mooney Viscosity of 55. Acrylonitrile-butadiene-styrene three (ABS3) is an ABS resin with an MFR at 220° C./10.0 kg (measured by an ISO 1133) and a density of 1.05 g/cm$^3$ (measured by an ISO 1183/B) that is modified with a linear low cis polybutadiene rubber 3 having a Mooney Viscosity of 55. Antioxidant is octadecyl-3-(3,5-di-tert.butyl-4-hydroxyphenyl)-propionate.

Mold Release Agent is a Fatty Acid Ester.

UV absorber is 0.15 percent of monomeric hindered amine type ultraviolet light absorber (Bis(1,2,2,6,6-pentamethyl-4-piperidyl)sebacate+methyl 1,2,2,6,6-pentamethyl-4-piperidyl sebacate) and 0.5 percent of a benzotriazole ultraviolet light absorber, 2-(2H-benzotriazol-2-yl)-4,6-bis(1-methyl-1-phenylethyl) phenol. Percents are based on the weight of the polymeric composition.

Buffer system is an equimolar composition of monosodium phosphate and disodium phosphate. The blends are prepared in a 25 mm twin screw extruder according to the following procedure. All components are added to the feed hopper of the compounding extruder. Additives including the antioxidants, mold release agents, and ultraviolet absorbers are mixed with powdered polycarbonate before they are fed to the extruder. In these examples, the polycarbonate powder mixed with the additives is about 5 percent of the total polycarbonate in the composition. Conditions are summarized in Table 1.

Table 1 shows conditions used for pellatization the PC/ABS compositions.

| Mass rate | | 20 kg/hr |
|---|---|---|
| Screw Speed | | 400 rpm |
| Temperatures | Zone 1 | 175 |
| | Zone 2 | 260 |
| | Zone 3 | 275 |
| | Zone 4 | 285 |
| | Zone 5 | 290 |
| | Zone 6 | 300 |
| | Die | 300 |
| Torque | | 65% |
| Die pressure | | 13 bar |

The polymeric compositions are pelletized. The pellets of the polycarbonates utilized are dried, for example in an air-circulating oven at 120° C. for 4 hours. The pellets are used for property testing with the exception of Charpy impact testing where injection molded bars are used.

Melt flow rate on the PC/ABS compositions is determined according to ISO 1133 (260° C./5 kg). Molecular weight of the polycarbonates (Mw PC) is determined using Gel Permeation Chromatography. The molecular weight of the polycarbonate component of the PC ABS compositions is after the melt flow rate test (Mw MFR 7' and Mw MFR 30') is determined using the Melt Flow Rate strands by Gel Permeation Chromatography. The Charpy test for the polycarbonate is performed according to ISO 179/eA. Charpy testing is conducted at both 23° C. and −30° C. The color is determined by visual examination.

Examples 1-19 are compositions of polycarbonate, acrylonitrile-butadiene-styrene, antioxidant and mold release agent, Examples 8-15 and 18 are compositions that further include a buffer system that is an equimolar composition of monosodium phosphate and disodium phosphate. Examples 15-16 and 18-19 are compositions that further include the UV absorber.

Table 2 shows the components of the compositions for each of examples 1-19 in percent by weight units.

| Ex. No. | PC Total | PC Type | ABS Total | ABS Type | Anti-oxidant | Mold release | Buffer System | UV Absorb |
|---|---|---|---|---|---|---|---|---|
| 1 | 40 | PC1 | 59.5 | ABS1 | 0.2 | 0.3 | 0 | 0 |
| 2 | 40 | PC1 | 59.5 | ABS2 | 0.2 | 0.3 | 0 | 0 |
| 3 | 40 | PC1 | 59.5 | ABS3 | 0.2 | 0.3 | 0 | 0 |
| 4 | 40 | PC2 | 59.5 | ABS3 | 0.2 | 0.3 | 0 | 0 |
| 5 | 40 | PC3 | 59.5 | ABS1 | 0.2 | 0.3 | 0 | 0 |
| 6 | 40 | PC3 | 59.5 | ABS2 | 0.2 | 0.3 | 0 | 0 |
| 7 | 40 | PC3 | 59.5 | ABS3 | 0.2 | 0.3 | 0 | 0 |
| 8 | 39.98 | PC1 | 59.5 | ABS1 | 0.2 | 0.3 | 0.02 | 0 |
| 9 | 39.98 | PC1 | 59.5 | ABS2 | 0.2 | 0.3 | 0.02 | 0 |
| 10 | 39.98 | PC1 | 59.5 | ABS3 | 0.2 | 0.3 | 0.02 | 0 |
| 11 | 39.98 | PC2 | 59.5 | ABS3 | 0.2 | 0.3 | 0.02 | 0 |
| 12 | 39.98 | PC3 | 59.5 | ABS1 | 0.2 | 0.3 | 0.02 | 0 |
| 13 | 39.98 | PC3 | 59.5 | ABS2 | 0.2 | 0.3 | 0.02 | 0 |
| 14 | 39.98 | PC3 | 59.5 | ABS3 | 0.2 | 0.3 | 0.02 | 0 |
| 15 | 39.33 | PC1 | 59.5 | ABS1 | 0.2 | 0.3 | 0.02 | 0.65 |
| 16 | 39.35 | PC1 | 59.5 | ABS1 | 0.2 | 0.3 | 0 | 0.65 |
| 17 | 40 | PC4 | 59.5 | ABS1 | 0.2 | 0.3 | 0 | 0 |
| 18 | 39.33 | PC4 | 59.5 | ABS1 | 0.2 | 0.3 | 0.02 | 0.65 |
| 19 | 39.35 | PC4 | 59.5 | ABS1 | 0.2 | 0.3 | 0 | 0.65 |

Table 3 shows the testing data of the examples. Melt flow rate (MFR) is in g/10' units. Molecular weight (Mw) is in g/mol units. Charpy data is in kJ/m² units. MFR is the MFR of the compounded PC/ABS compositions as disclosed in Table 1.

| Ex. No. | MFR | Mw PC feedstock | Mw PC/ABS | Mw MFR 30' | Mw Auto | Charpy at 23° C. | Charpy at −30 | UV Color |
|---|---|---|---|---|---|---|---|---|
| 1 | 21.8 | 28,200 | 23,200 | 20,200 | 19,800 | 46.0 | 21.1 | White |
| 2 | 32.9 | 28,200 | 18,800 | 16,400 | 5,300 | 29.5 | 15.3 | White |
| 3 | 27.5 | 28,200 | 19,800 | 17,200 | 13,200 | 32.5 | 16.7 | White |
| 4 | 26.0 | 26,000 | 19,600 | 18,100 | 14,700 | 36.8 | 21.1 | White |
| 5 | 25.1 | 27,400 | 20,400 | 18,700 | 7,300 | 41.4 | 23.1 | White |
| 6 | 42.0 | 27,400 | 16,300 | 15,200 | 4,600 | 23.7 | 15.7 | White |
| 7 | 33.9 | 27,400 | 16,900 | 15,500 | 11,300 | 26.2 | 14.6 | White |
| 8 | 15.6 | 28,200 | 25,300 | 22,600 | 24,100 | 55.4 | 35.1 | White |
| 9 | 16.5 | 28,200 | 24,900 | 20,800 | 24,200 | 51.2 | 26.3 | White |
| 10 | 14.5 | 28,200 | 25,600 | 23,200 | 25,300 | 46.0 | 36.6 | White |
| 11 | 16.7 | 26,000 | 23,900 | 22,200 | 23,600 | 59.3 | 32.7 | White |
| 12 | 16.7 | 27,400 | 24,400 | 21,600 | 23,300 | 46.1 | 35.3 | White |
| 13 | 19.4 | 27,400 | 23,500 | 19,600 | 22,500 | 37.1 | 21.1 | White |
| 14 | 16.3 | 27,400 | 24,400 | 21,100 | 23,800 | 52.4 | 28.9 | White |
| 15 | 18.2 | 28,200 | 25,400 | 20,000 | 21,500 | 70.9 | 58.2 | White |
| 16 | 26.2 | 28,200 | 21,400 | 19,300 | 5,600 | 47.2 | 30.2 | Yellow |
| 17 | 33.6 | 28,400 | 19,900 | 17,600 | 6,700 | 39.0 | 20.5 | White |
| 18 | 22.1 | 28,400 | 23,400 | 17,000 | 20,500 | 48.4 | 32.8 | White |
| 19 | 44.8 | 28,400 | 16,800 | 14,600 | 2,900 | 31.1 | 14.5 | Yellow |

Examples 1-3 and 8-10 contain the same CALIBRE® 300-10 but each have varying ABS components. However, examples 8-10 further comprise the buffer system as disclosed herein. In each of examples 8-10, several properties are improved including the molecular weight retention after compounding (Mw PC/ABS), the molecular weight after the MFR measurement with extended residence times (Mw MFR 30'), the hydrolytic stability expressed by the molecular weight after autoclave testing (Mw Auto) and the impact performance as expressed by the notched Charpy Impact at 23° C. and −30° C.

Examples 4 and 11 contain the same polycarbonate but each have varying ABS components. However, example 11 further comprises the buffer system as disclosed herein. In example 11, several properties are improved including the molecular weight retention after compounding (Mw PC/ABS), the molecular weight after the MFR measurement with extended residence times (Mw MFR 30'), the hydrolytic stability expressed by the molecular weight after autoclave testing (Mw Auto) and the impact performance as expressed by the notched Charpy Impact at 23° C. and −30° C.

Examples 5-7 and 12-14—contain the same polycarbonate but each have varying ABS components. However, examples 12-14 further comprise the buffer system as disclosed herein. In each of examples 12-14, several properties are improved including the molecular weight retention after compounding (Mw PC/ABS), the molecular weight after the MFR measurement with extended residence times (Mw MFR 30'), the hydrolytic stability expressed by the molecular weight after autoclave testing (Mw Auto) and the impact performance as expressed by the notched Charpy Impact at 23° C. and −30° C.

The PC/ABS blends are typically a whitish color upon completion and pelletization. Examples 1 and 17 are PC/ABS blends that are absent a buffer system and a UV absorber. Examples 1 and 17 are white. On the other hand, examples 16 and 19 are PC/ABS blends that further include a UV absorber. Examples 16 and 19 are yellow. Finally, addition of the buffer system to examples 15 and 18 show that the pelletized polymeric composition is white. Therefore, addition of the buffer system, in addition to improving all properties as already described above, also improves the color of the PC/ABS blends comprising the UV absorber package.

When UV absorber is added to samples 1 and 17, it is observed that the molecular weight stability of the PC/ABS formulations is decreased, as well as the hydrolytic stability, the Charpy impact performance and the color (samples 16 and 19).

When the buffer package is added to formulations 16 and 19, all these properties are significantly improved (samples 15 and 18) up to a level which is better than for the initial samples 1 and 17.

Parts by weight as used herein refers to 100 parts by weight of the composition specifically referred to. Any numerical values recited in the above application include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value, and the highest value enumerated are to be considered to be expressly stated in this application in a similar manner. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

The invention claimed is:

1. A composition comprising:
   a) one or more polycarbonates in an amount of about 10 to about 60 percent by weight;
   b) one or more vinylidene aromatic substituted polymers in an amount of about 35 to about 90 percent by weight; and
   c) a buffer system that controls a pH in water at 25° C. at a value of about 6.0 to about 8.0 wherein the buffer system is in an amount from about 0.005 percent to about 0.030 percent by weight, wherein weight percentages are based on the total weight of the composition.

2. The composition according to claim 1, wherein the buffer system has a pKa between about 4 and about 10.

3. The composition according to claim 1 comprising:
   a) from about 30 to about 60 percent by weight of the one or more polycarbonates;
   b) from about 35 to about 70 percent by weight of the one or more vinylidene aromatic substituted polymers; and
   c) from about 0.005 percent to about 0.030 percent by weight of the buffer system;
   wherein weight is based on the total weight of the composition.

4. The composition according to claim 1, wherein the buffer system is present in an amount from about 0.020 percent to about 0.030 percent by weight.

5. The composition according to claim 1, wherein the vinylidene aromatic substituted polymers comprise:
   a) from about 5 to about 40 percent by weight of one or more unsaturated nitriles;
   b) from about 1 to about 70 percent by weight of one or more conjugated dienes; and
   c) from about 25 to about 94 percent by weight of one or more vinylidene aromatic substituted monomers.

6. The composition according to claim 1, wherein the buffer system comprises an inorganic buffer, an organic buffer, or both.

7. The composition according to claim 1, wherein the buffer system comprises a counterion of one or more of sodium, potassium, or calcium.

8. The composition according to claim 1, wherein the buffer system comprises acetates, sulfonates, phosphates, ammonia, formates, or any combination thereof.

9. The composition according to claim 1, wherein the buffer system comprises a Good's buffer.

10. The composition according to claim 1, wherein the buffer system has a pKa of about 5.0 to about 9.0.

11. The composition according to claim 1, wherein the composition further comprises an additive including fillers, fibers, thermal stabilizers, UV absorbers, light stabilizers, light diffusing agents, mold release agents, colorants, pigments, dyes, or any other additive.

12. The composition according to claim 1, wherein the composition is essentially free of phosphoric acid.

13. The composition of claim 1, wherein the buffer system positively stabilizes the molecular weight of the composition such that under conditions of exposure to an autoclave at 125° C./100% relative humidity for 24 hours the composition exhibited a loss of molecular weight of the polycarbonate component of about 5000 g/mol or less.

14. An article comprising the composition according to claim 1 as a molded structure.

15. A method comprising:
   a) mixing one or more polycarbonates, one or more vinylidene aromatic substituted polymers, and from about 0.005 percent to about 0.030 percent by weight of a buffer system that controls pH in water at 25° C. at a value of about 6.0 to about 8.0 wherein weight percentages are based on the total weight of composition; and
   b) extruding the mixed polymer.

16. The method according to claim 15, wherein the one or more vinylidene aromatic substituted polymers are polymerized by a mass polymerization process comprising:
   a) cutting or chopping one or more polymers of conjugated dienes;
   b) mixing the one or more polymers of conjugated dienes, one or more unsaturated nitriles, and one or more vinylidene aromatic substituted monomers;
   c) polymerizing the one or more polymers of conjugated dienes, the one or more unsaturated nitriles, and the one or more vinylidene aromatic substituted monomers to form one or more vinylidene aromatic substituted polymers;
   d) degassing the one or more vinylidene aromatic substituted polymers and recycling volatile monomers; and
   e) pelletizing the one or more vinylidene aromatic substituted polymers.

17. The method according to claim 16, wherein the composition comprises
   a) from about 10 to about 60 percent by weight of the one or more polycarbonates;
   b) from about 35 to about 90 percent by weight of the one or more vinylidene aromatic substituted monomers; and
   c) from about 0.005 percent to about 0.030 percent by weight of the buffer system;
   wherein weight is based on the total weight of the composition;
   wherein the buffer system has a pKa between about 4 and about 10.

18. The method according to claim 16, wherein the one or more polycarbonates and at least a portion of the buffer system are contacted before contacting the one or more vinylidene aromatic substituted polymers.

19. The method according to claim 16, wherein the method further comprises
   f) melting the composition;
   g) injecting the melted composition into a mold;
   h) cooling the composition to form a molded structure; and
   i) removing the molded structure from the mold.

20. A composition comprising:
   a) one or more polycarbonates in an amount of about 10 to about 60 percent by weight;
   b) one or more vinylidene aromatic substituted polymers in an amount of about 35 to about 90 percent by weight; and
   c) a molecular weight stabilizer consisting of a buffer system that controls pH in water at 25° C. at a value of about 6.0 to about 8.0 wherein the buffer system is in an amount from about 0.005 percent to about 0.030 percent by weight wherein weight percentages are based on the total weight of the composition;
   wherein under conditions of exposure to an autoclave at 125° C./100% relative humidity for 24 hours the composition exhibited a loss of molecular weight of the polycarbonate component of about 5000 g/mol or less.

* * * * *

UNITED STATES PATENT AND TRADEMARK OFFICE
CERTIFICATE OF CORRECTION

| | | |
|---|---|---|
| PATENT NO. | : 11,781,007 B2 | Page 1 of 1 |
| APPLICATION NO. | : 17/637634 | |
| DATED | : October 10, 2023 | |
| INVENTOR(S) | : Claude T. E. Van Nuffel et al. | |

It is certified that error appears in the above-identified patent and that said Letters Patent is hereby corrected as shown below:

In the Claims

Column 29, Claim 1, Line 40, "a pH" should be —pH—

Signed and Sealed this
Thirteenth Day of February, 2024

Katherine Kelly Vidal
*Director of the United States Patent and Trademark Office*